United States Patent
Neubauer

[11] Patent Number: 5,600,110
[45] Date of Patent: Feb. 4, 1997

[54] WEAR-RESISTANT STEERING COLUMN SWITCH WITH LEVER PIVOTABLE ABOUT TWO MUTUALLY PARALLEL AXES

[75] Inventor: Walter Neubauer, Lauffen, Germany

[73] Assignee: ITT Automotive Europe GmbH, Germany

[21] Appl. No.: 347,357

[22] PCT Filed: Jun. 9, 1993

[86] PCT No.: PCT/EP93/01470
§ 371 Date: Dec. 1, 1994
§ 102(e) Date: Dec. 1, 1994

[87] PCT Pub. No.: WO93/25407
PCT Pub. Date: Dec. 23, 1993

[30] Foreign Application Priority Data

Jun. 11, 1992 [DE] Germany ............... 42 19 056.8
Jun. 9, 1993 [DE] Germany ............... 43 19 065.0

[51] Int. Cl.⁶ .................. H01H 21/36; H01H 3/16; H01H 9/02
[52] U.S. Cl. .................. 200/61.54; 200/61.27
[58] Field of Search ............ 200/61.27, 61.3, 200/61.34, 61.35, 61.54, 4, 5 R, 12

[56] References Cited

U.S. PATENT DOCUMENTS

| 4,142,076 | 2/1979 | Bird ............... 200/4 |
| 4,376,236 | 3/1983 | Long et al. ............ 200/61.27 |
| 4,748,298 | 5/1988 | Chretien ............ 200/4 X |
| 4,810,839 | 3/1989 | Chretien ............ 200/4 |
| 5,196,659 | 3/1993 | Neubauer ............ 200/61.27 |

FOREIGN PATENT DOCUMENTS 3940284  6/1991  Germany ............ H01H 21/36

OTHER PUBLICATIONS

International Search Report for PCT/EP93/01470 filed 9 Jun. 1993.

Primary Examiner—J. R. Scott
Attorney, Agent, or Firm—Rader, Fishman & Grauer PLLC

[57] ABSTRACT

A steering column switch is contained within a switch housing and a control lever is rotatably supported in a carrier. The carrier is rotatable transversely to the motion plane of the control lever in the switch housing. The control lever is pivotable in succession about two axes allocated to the actuation of two corresponding switches. The steering column switch greatly extends switch life by using suitable limiting components within the lever which reduce the wear on the lever caused by switching actuation. An improved embodiment includes providing the pivoting lever with a longitudinal aperture for pivoting the lever about two axes.

22 Claims, 6 Drawing Sheets

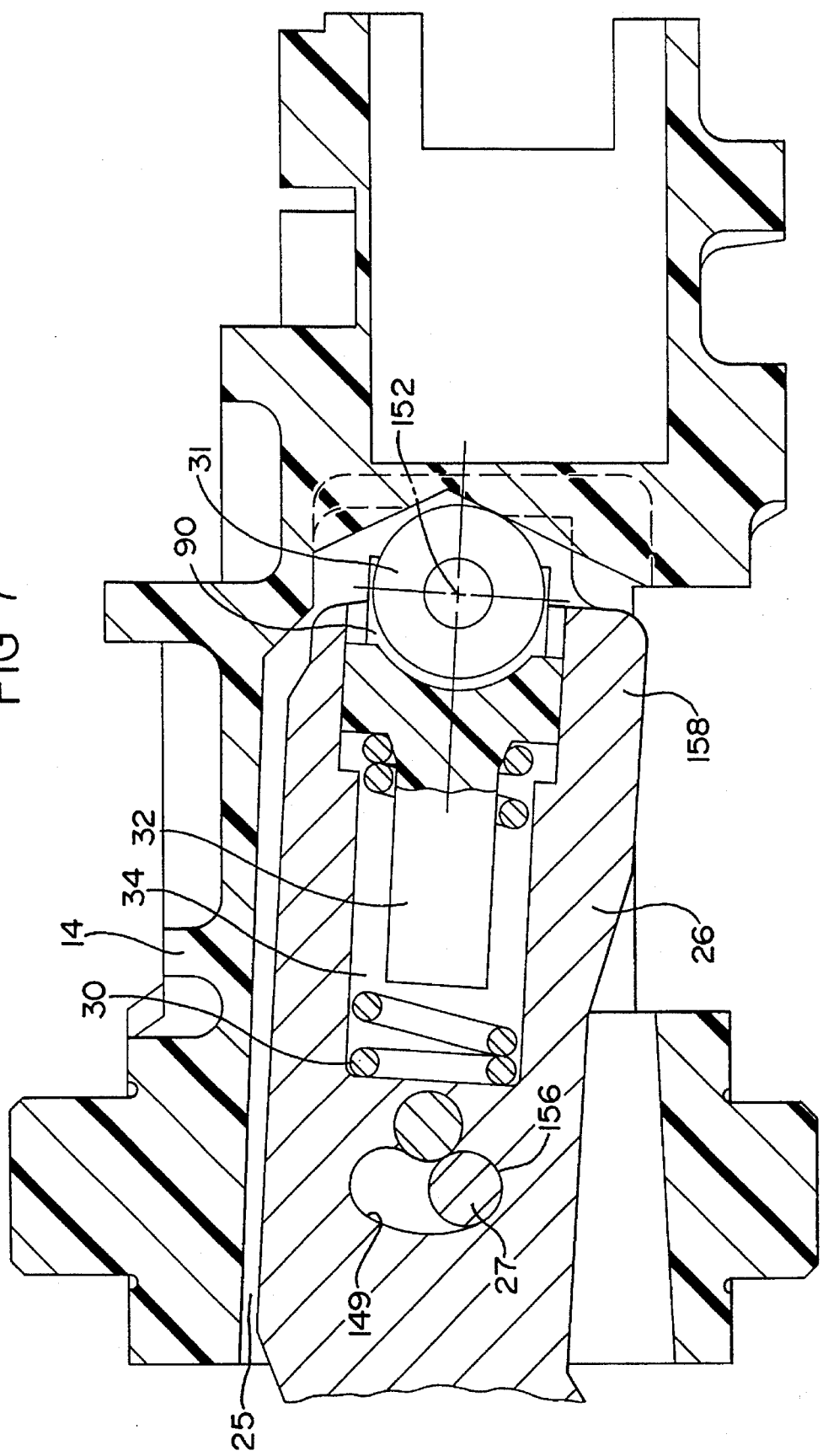

WEAR-RESISTANT STEERING COLUMN SWITCH WITH LEVER PIVOTABLE ABOUT TWO MUTUALLY PARALLEL AXES

TECHNICAL FIELD

This invention relates to a steering column switch for automotive vehicles and more particularly relates to steering column switches that employ switch levers that are pivotable about two offset axes.

BACKGROUND OF THE INVENTION

Steering column switches of this general type are known from German Published Patent Application (DE-OS) No. 39 40 284. This steering column switch is provided with a longitudinal aperture guide for the lever within the carrier so that, on the one hand, the switch is pivotable alongside the longitudinal aperture about a second axis, thus actuating a second switch, and is further pivotable about a first axis by way of a stop formed by the edge of the longitudinal aperture and thus actuates a first switch.

It is an aim of this invention to improve the switching behaviour of two axes steering column switch and in particular to increase the number of possible switching actuations of two axes switches.

SUMMARY OF THE INVENTION

Generally, this invention thus consists in reinforcing the guiding edges of the longitudinal aperture in a simple manner, particularly so in the guiding area. The longitudinal aperture is preferably worked directly into the material of the switch lever. The same applies to the fastening of the limiting component. This invention, however, is also applicable to gates insertable into the lever such as shown, for example, in German Published Patent Application No. 39 40 284. Such exchangeable gates, for instance, may be the plastic type which, according to the present invention, will then be reinforced suitably by inserted limiting components.

An improvement in the mode of operation of the steering column switch may be achieved whereby increased strength, in particular the hardness, is introduced thereby reducing wear on the processed surface caused by the actuation of the switch.

An especially simple design of the limiting component is preferred. In this preferred design the limiting plate is inserted on the edge of the longitudinal aperture so that, over the major part of its circumferential surface, the plate itself is embraced and held by the material of the lever while, on the other hand, a part of its surface forms the guideway within the longitudinal aperture in the spot where a major amount of wear would normally take place.

Preferably, the plate includes a cylindrical pin (hereinafter often referred to as 'bolt') anchored in the carrier preferably supports itself permanently on the plate over the entire path of its motion. This feature is especially suitable in cases where only one rest position is provided within the longitudinal aperture into which the lever automatically returns (under a resilient action working on the lever).

It is intended to use this invention for a steering column switch with two stable end positions, and it is preferable that the limiting component is a cylindrical pin which is fastened to the lever. The use of these characteristics is especially recommended if the longitudinal aperture has a circular curvature so that the surface area of the second cylindrical pin forms a part of the curved path of the longitudinal aperture.

The resetting (or the change-over) action of the lever can even be improved by resiliently prestressing the lever. Of course, by means of such a resilient action, it is also possible to improve the resetting behaviour in case of a straight longitudinal aperture.

By constructing the first and second cylindrical pins with approximately the same diameters an especially effective design of a change-over lever results. There, a comparatively strong curvature is achieved for the curved path, said curvature enhancing the change-over action of the lever in the sense of a stop effect.

A further enhancement of the stop effect can be achieved in constructing the curvature of the guiding surface of the limiting component so that it is larger than the curvature of the following guide sections of the longitudinal aperture.

Preferably the limiting component is symmetrically arranged in respect to the longitudinal aperture.

With regard to resetting into one sole end position in a straight longitudinal aperture it is recommended to incline the longitudinal aperture so as to point to the first switch contact. Because the longitudinal aperture, with its end averted from the first switch contact, is situated at a greater distance with regard to a resilient component inserted into the lever than with the switch-side end, here, there will result a determined rest position whence the switch contact can always be actuated directly. This design may be of special importance for switches that are frequently actuated, for instance, for audible or visual signalling in vehicles and it will save switching travels.

If a steering column switch is used which has a lever with two stable end positions it is preferable that the longitudinal aperture extends along side of a circle around the second axis and portions of the contour follow a circle described about the axis of the second cylinder. There, the two end positions defined by the longitudinal aperture are assigned to the operation of respectively the lower and upper beams.

Preferably the stop assigned to the lower beam is used as fulcrum of the lever for actuating the flashing function. The stop assigned to the upper beam may also serve as fulcrum for a further switch operation, such as for an additional hooting signal or any other suitable devices.

A further way for attaining the above-indicated aim in a steering column switch of the generic type consists in the placement of the individually operable switches relative to the pivoting movements so that relatively small switching motions will result within the scope of practical applications. Thus, it is particularly expedient to assign the lever guided in a longitudinal aperture to a rest position whence it is possible to actuate the most frequently operated switch without any major switching travel. Expediently one proceeds from the principle that lower and upper beams are actuated by one change-over switch since but one of the beam types is needed at a time and since the switch is to be actuated only when there is a change in the beam type. On the other hand, what is aimed at is that the lever have but one sole stable rest position from which the most frequently needed switch can be actuated directly. The present invention consists of longitudinal aperture so that the control lever will always reach a rest position whence the second contact piece is operable at any time. The second contact piece can be assigned to the flashing function or any other device which is to be ready for operation at any time such as an electric horn, the windshield wipers or the like.

Advantageously, the point of action of the second contact piece lies on the lever in the range of the pivotable support of the lever, with the point of action of the first contact piece lying in the area of the lever end situated in the carrier. By means of the inventive arrangement of the longitudinal aperture there results the advantage that the lever can be pivoted without moving the first contact piece. In this design, the axis about which the lever is pivoted moves within the longitudinal aperture whereas the lever end situated in the carrier moves very little. Because the longitudinal aperture essentially extends in the direction of the second contact piece, the pivoting movement of the lever is completely transmitted to the second contact piece. This pivoting movement can be carried out until the axis comes to rest on the one end of the longitudinal aperture. In this position the second contact piece adopts its switch position. The lever now being pivoted further, particularly so beyond a pressure point (which is felt by the operator), the lever no longer will pivot about the end situated in the carrier but rather about the axis situated in the longitudinal aperture and abutting the one end of the longitudinal aperture. During this further pivoting movement the end situated in the carrier is pivoted, and the first contact piece becomes activated. Now, with this first contact piece controlling the beam change-over function and with the second contact piece controlling the flashing function, it is possible to actuate the flashing function by the first operation of the lever and to actuate the change-over of the driving beams by way of the further operation of the lever. In the inventive design, the lever needs to be moved in only one direction, the lever first actuating the flashing function and thereupon the change-over of the driving beams.

In a further aspect, the present invention provides that the pivot axis is formed by a bolt which, in the rest position of the lever, is situated at that end of the longitudinal aperture which is remote from the second contact piece. Thereby, the maximum travel of the bolt within the longitudinal aperture is made available for the operation of the second contact piece. The rest position of the second contact piece is defined by the abutting of the bolt against that end of the longitudinal aperture which is remote from the second contact piece whereas the operating position of the second contact piece is defined by the abutting of the bolt against that end of the longitudinal aperture which is facing the second contact piece.

Preferably, the lever has at least two switching steps, with the second contact piece being operated in the first switching step and with the first contact piece being operated in the second switching step.

According to a further aspect, the present invention provides that the lever extends into the switch housing through a wall of the same, that the first and second contact pieces and/or the second moving contact are essentially aligned transversely to the lever and that the second contact piece and/or the second moving contact are located near the wall of the switch housing penetrated by the lever, and that the first contact piece and the change-over device are arranged at a distance with regard to the second contact piece. This design has the advantage of being very compact and of attaining small switching travels on the lever due to the large distance between the two contact pieces.

In one embodiment it is provided that the lever is pivotably supported in a pivotable carrier, that the slide of the change-over device is coupled with the lever through a penetration in the carrier, and that the second moving contact and/or the second contact piece is located between a bearing bridge of the carrier and a base plate carrying fixed electric contacts. In the inventive design of the steering column switch, this arrangement has the advantage of requiring a small number of components.

BRIEF DESCRIPTION OF THE DRAWINGS

FIG. 7 is the embodiment of FIG. 6 showing a modified switch position.

DETAILED DESCRIPTION OF THE PREFERRED EMBODIMENTS

Figure 1:
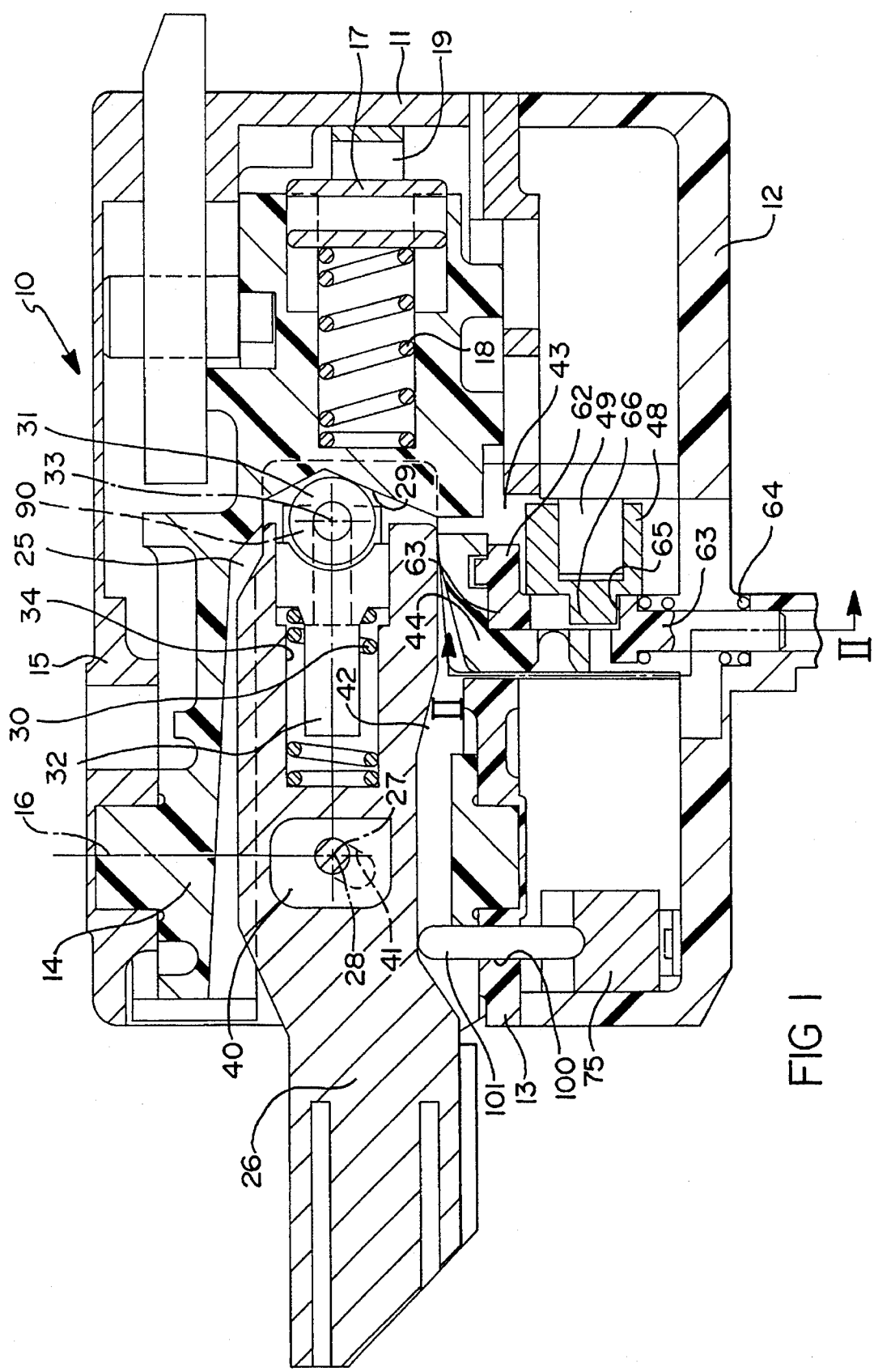
FIG. 1 is a partial longitudinal, cross sectional view through the first embodiment of the present invention.

In the illustrated steering column switch, a housing 10 features a zinc die-cast box-type top part 11 and a plastic bottom tray 12, as well as an intermediate bottom 13. The intermediate bottom 13 is essentially located on the level of the joint between the top part and the bottom tray 12. Carrier 14 is supported in a cover 15 of the top part 11 and in the intermediate bottom 13 so as to be pivotable about axis 16 in a plane generally referred to as being horizontal. The switching curve of the carrier 14 is determined by a stop roller 17, guided on the carrier 14 and supported via a spring 18, and by two stop levers 19 pivotably supported on the housing 10, the stop roller 17 being pressed by spring 18 against the two stop levers 19.

A lever 26 extends into a cavity 25 of the carrier 14. Bolt 27 whose axis 28 passes perpendicularly through axis 16, pivotally supports lever 26 on the carrier 14 in a plane generally referred to as being vertical. A wall of the carrier 14 which faces cavity 25 is designed as switching curve 29 against which a helical spring 30 presses a stop roller 31 via a T-shaped biasing member 32. The stop roller 31 is pivotable about an axis 33. Helical spring 30 is accommodated in a pocket bore 34 of lever 26.

Inserted into lever 26 is a separate bolt guide 40 provided with a longitudinal aperture 41 for bolt 27. On either side of lever 26 the bolt 27 extends into matching bores of the carrier 14 which are not shown in further detail. The bolt guide 40 is rounded on three outside edges running parallel to longitudinal aperture 41, while one edge of the guide is angular. This will always ensure correct mounting of the bolt guide on lever 26. It is also possible to provide the longitudinal aperture 41 directly in lever 26.

Along the direction of axis 28 of bolt 27, the dimensions of the cavity 25 within the carrier 14 and of the lever 26 are adjusted to each other so that the lever 26, while pivoting about the axis 16, turns the carrier 14 along.

The cavity 25 is designed so as to flare outside. The advantage of this design is that, in the event of small pivoting movements within this cavity 25, the lever 26 can pivot about the stop roller 31 or rather about a guide 90 provided on the end of the lever 26 without bumping against the wall of the cavity 25. During this pivoting movement, the bolt 27 moves within the longitudinal aperture 41.

If the lever 26 is pivoted further, which likewise happens clockwise, this will be about axis 28 since the bolt 27 abuts on the lower end of the longitudinal aperture 41. In doing so, it actuates a slide 44 of a first change-over device supported in the bottom tray 12 and in the intermediate bottom 13 of the housing 10. Slide 44 extends through a penetration 42 in the carrier 14 and through a penetration 43 in the intermediate bottom 13.

The slide 44 essentially has the shape of an angle which rests with one of its legs against the lever 26 (FIG. 1). Two springs 45 (FIG. 3) are provided on the other leg of slide 44 and are arranged parallel to the pivot axis 16 of the carrier 14. Slide 44 is guided in two grooves 46 which are provided in two rails 47 protruding from the intermediate bottom 13 into the bottom tray 12. To save weight, excavations 52 can be provided at the top of slide 44.

A further portion of the change-over device is a contact piece 48 (FIG. 2) pivotably supported on a journal 49 of the bottom tray 12. A contactor controller 50 is guided within a slot of said contact piece and is radially displaceable therein. Contactor controller 50 is supported in said slot by way of a compression spring 51.

The contactor controller 50 cooperates alternatively with the two flanks of a roof-shaped stop element 55 (preferably made of plastic) which is sprayed onto the free end of a contact beam 56. Contact beam 56 is supported with its other end in a knife-edge-type manner on a fixed contact 57 fitted in the bottom tray. Between the fixed contact 57 and the stop element 55, the contact beam 56 carries a double-contact rivet 58 which in the two possible switch positions of the contact beam 56 either rests against a fixed contact 59 or 60. Both fixed contacts 59 and 60 are fitted in bottom tray 12.

Figure 2:
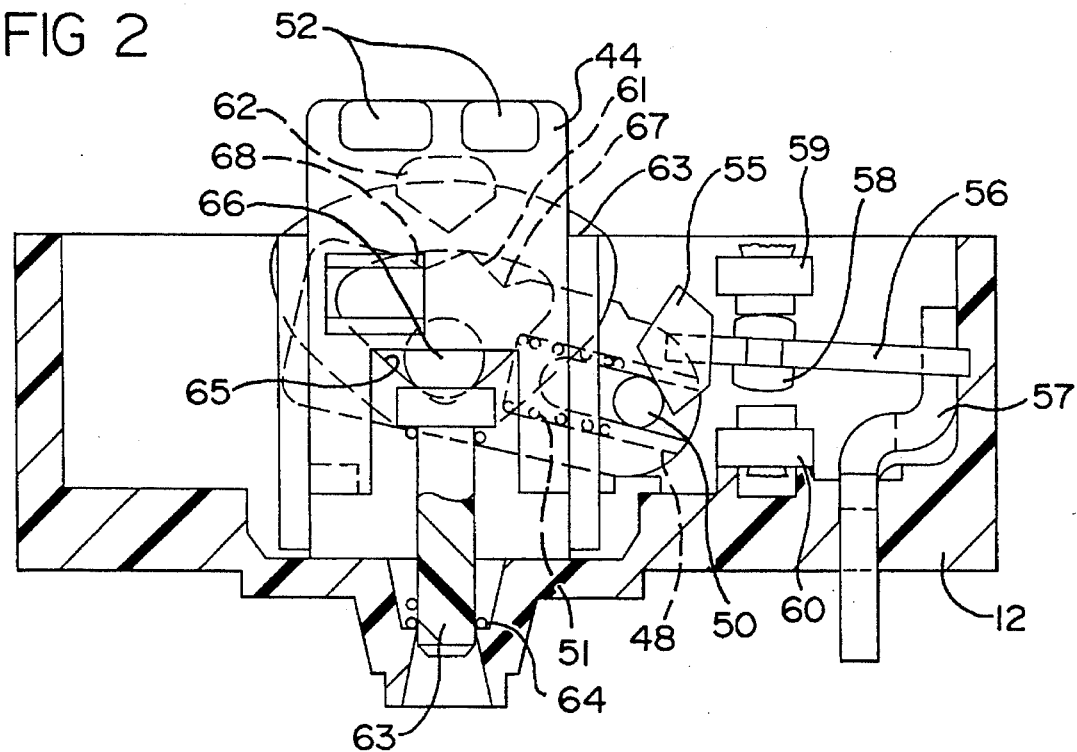
FIG. 2 is a cross sectional view taken along lines II—II of FIG. 1.

In the switch position clearly shown in FIG. 2, the double-contact rivet 58 is pressed against fixed contact 59 because of the force of the compression spring 51 acting on the contactor controller 50. If the contact piece 48, as seen in FIG. 2, is pivoted counterclockwise, the contactor controller 50 will slide along the flank of the stop element 55, against which it is resting, in the direction of the ridge of the roof, with the compression spring 51 becoming increasingly stressed. After passing the ridge of the roof the contactor controller 50 will slide on the other flank away from the ridge of the roof, with the compression spring 51 releasing and abruptly urging the contact beam 56 into the other switch position in which the double-contact rivet 58 will rest against fixed contact 60.

For pivoting, the contact piece 48 has a control curve 61 with two V-shaped depressions 67 and 68 cooperating with a change-over cam 62. In its rest position, this change-over cam 62 lies centrally above the control curve 61 and is shaped on a pivotable slide piece 63 essentially located between the slide 44 and the contact piece 48 and guided in the housing so as to be displaceable in the same direction as the slide 44, yet, additionally also being arranged so as to be pivotable. Fixed between the pivotable slide piece 63 and the bottom tray 12 is a compression spring 64 which will load the pivotable slide piece 63 against the sliding direction and press it against the slide 44 if there is a change-over. Further, the pivotable slide piece 63 has an internal V-shaped resetting curve 65 abutted by a reset pin 66 of the contact piece 48.

If the lever 26, as seen in FIG. 1, is pivoted clockwise, the slide 44 and the pivotable slide piece 63 will be displaced against the force of the compression spring 64. Depending on the position of the contact piece 48, the change-over cam 62 will slide into one of the depressions 67 or 68 of the control curve 61, with the sliding motion of the pivotable slide piece 63 being superimposed by a rotation. As soon as the change-over cam 62 has reached the deepest point of one of the depressions a further sliding displacement of the slide 44 will cause the contact piece 48 to pivot and will thus bring about a change-over of contact beam 56. The compression spring 64 will again reset the pivotable slide piece 63 and the slide 44 after the release of the lever 26, with the pivotable slide piece also returning into an unpivoted position because of the reset pin 66 and the resetting curve 65.

Figure 3:
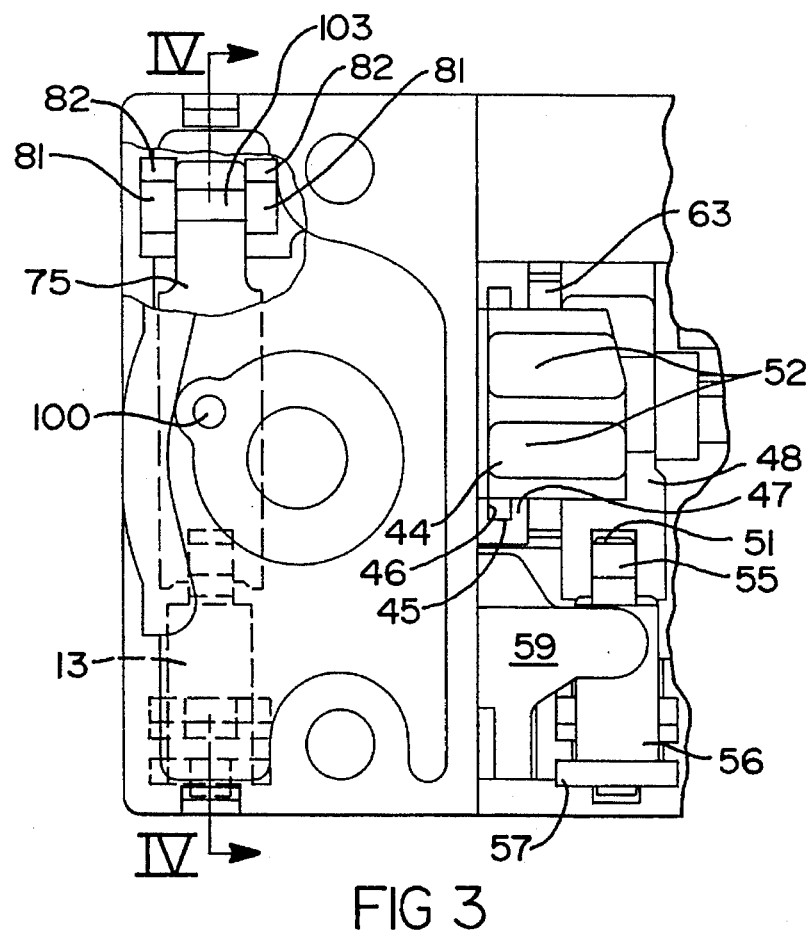
FIG. 3 is a top view on the base plate of the embodiment of FIG. 1, fitted with components.
Figure 4:
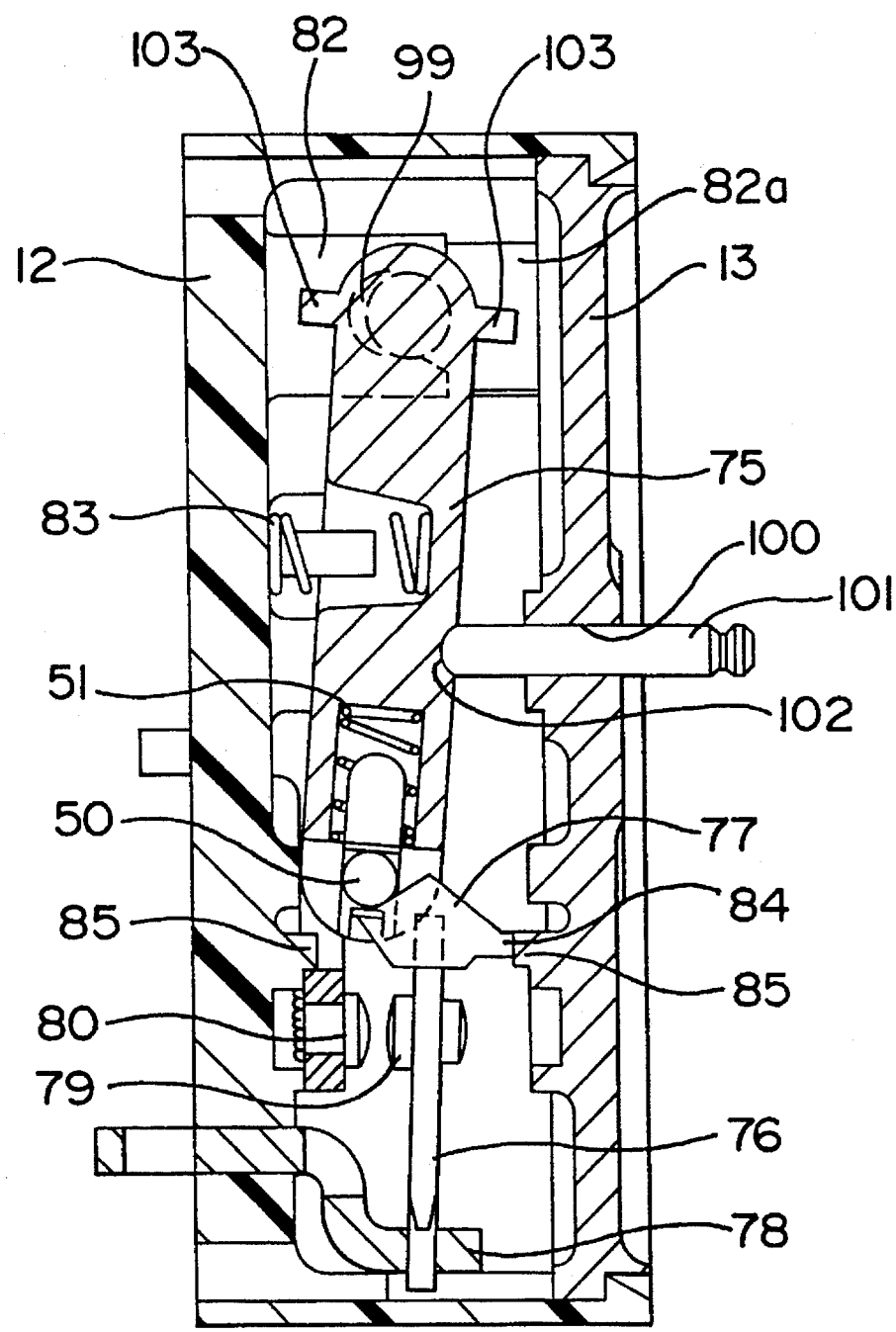
FIG. 4 is a cross sectional view taken along line IV—IV of FIG. 3.

In the bottom tray 12, a second contact piece 75 and a second moving contact beam 76 (FIG. 4) are accommodated near the wall of switch housing 10 through which the lever 26 extends into the switch housing 10 and, essentially, transversely to the lever 26 and, thus, in parallel alignment to contact piece 48 and to contact beam 56 (FIG. 3). This second contact piece 75 also has a contactor controller 50 and a compression spring 51 pressing the contactor controller 50 against a stop element 77 (element 77 is preferably sprayed onto the contact beam 76) and again element 77 is preferably shaped like a roof. The contact beam 76 is supported pivotably on a fixed contact 78 and carries a contact rivet 79 between its point of support and the stop element 77. By means of this contact rivet 79, the contact beam 76 can act on a fixed contact 80 arranged below the contact beam 76. At its end remote from the contact beam 76, the contact piece 75 is pivotably supported by two journals 81 (FIG. 3) within two journal receptacles 82 of the bottom plate 12. Receptacles 82 are shut off by two appertaining retainers 82a of the intermediate bottom 13. Each of the journal receptacles 82 comprises the longitudinal aperture 99 for the journals 81. Longitudinal aperture 99 essentially extends in the longitudinal direction of the tappet 101. Between the point of support and its end facing the contact beam 76, the contact piece 75 is supported on the bottom plate 12 by way of a compression spring 83. Referring to FIG. 4, the compression spring 83 urges the contact piece 75 to pivot counterclockwise.

The stop element 77 (in contrast to stop element 55 of contact beam 56) is provided with a projection 84 for resting against a stop 85 of the intermediate bottom 13 in the position of the contact beam 76 as shown in FIG. 4.

If the lever 26 is moved out of its rest position, in which the bolt 27 rests at the upper end of longitudinal aperture 41, so as to be pivoted about the guide 90, then this will relieve tappet 101 arranged in bore 100 in intermediate bottom 13 and extending between lever 26 and a second contact piece 75. The upper end of tappet 101 acts on the lever 26 between the free end of the lever 26 and the bolt guide 40 near the bolt 27. Upon a rotation of lever 26 during which the bolt 27 moves within the longitudinal aperture 41, the second contact piece 75, as seen in the section as per FIG. 4, is pivoted counterclockwise. Thereby, in the manner already described with reference to contact beam 56 and contact piece 48, the contact beam 76 is switched over under the action of the force of spring 83 and 51 into a position in which the contact beam 76 abuts with contact rivet 79 against the fixed contact 80. The steering column switch being preferably integrated into an automotive vehicle and the on-board network being connected, the flashing function will be on, now. The actuation of the lever 26 enables an actuation of the flashing signal with only a slight pivoting travel of lever 26, with the slide 44 not being actuated.

If the flashing function is turned on, with the lever 26 leaving its first switch position and changing over into its second switch position in which the bolt 27 will come to rest just on the lower end of the longitudinal aperture 41, the contact piece 75 which rests against the intermediate bottom 13 will maintain its activated position. Now the first contact piece will be actuated by way of the slide 44. In this second switch position, there is a change-over between the upper and lower beams of the automotive vehicle.

If now the lever 26 is released, the contact piece 48 and the contact beam 56 will remain in the position just reached while the other moved switch components, including contact piece 75 and contact beam 76, will be reset again.

It can be noticed that the inventive steering column switch has two fulcrums (or pivot points) separate from each other. One fulcrum operates one switch (e.g. high/low beams) and the second fulcrum operates the second switch (e.g. turning indicators). One fulcrum is formed by the guide 90 for the first switch position, with the second fulcrum or rather the second pivot axis being formed by the bolt.

Because of the compact space requirements as well as the small switching travels, the fulcrum for flashing was arranged remotely from the fulcrum for the change-over of the beams in order to achieve a safe change-over of the flashing function without any additional transmission lever. The position of the longitudinal aperture 41 in this design has been selected so as to point in the direction of the second contact piece 75, on the one hand, and essentially extend along the direction of helical spring 30 (or stop roller 31), on the other hand. Because of this arrangement an advantage results in that, in the rest position of the lever 26, the bolt 27 automatically will adopt a rest position in the longitudinal aperture 41 in that the same will be displaced by way of the helical spring 30 so that the bolt 27 will come to rest against the upper end of the longitudinal aperture 41. Upon the actuation of the lever thus, the lever 26 first will perform a pivoting movement upwards with a travel of the length of the longitudinal aperture 41, with the flashing function being released by way of the tappet 101. The fulcrum for this function is the upper abutment surface of the guide 90 on the carrier 14. The lower end of the longitudinal aperture 41 abuts on bolt 27, the same will (as the lever 26 will be further pivoted) serve as fulcrum for the change-over of the driving beams, with the end of the lever 26 which is situated in the carrier 14 being pivoted downwards. Then, the beam change-over function will be brought about by way of the slide 44 and the switching curve shaped like a heart. After the release of the lever 26, the same will again return into the initial position because of the force of the helical spring 30, the flashing function again being turned off by the action of the tappet 101. The flashing function is turned on by way of the compression spring 83 and automatically turned off via the tappet 101 (i.e. it cannot stay on because of being stuck or the like). Preferably a ball-segment-shaped impression 102 is provided in prolongation of the tappet 101 and worked into the top surface of contact piece 75 and engaged by the tappet 101 with a rounded end. This will further improve the guidance of the tappet 101.

Because of the varying tolerance deviations of the individual components of the device, it must be ensured that there will be an overstroke in the supporting area of the tappet 101 in order to guarantee a safe change-over of the flashing function. As already mentioned, the flashing function will be turned off by way of the tappet 101. The same is arranged so that, during the tuning-off motion, at first the contact piece 75 will be shifted on the contact bridge side until it reaches the stop on the contact plate above the tappet 101. After reaching the stop on the contact plate, the contact piece 75 will be pressed downward on the supporting side in a longitudinal aperture 99 by the amount of the overstroke. Because of this overstroke (defined by the length of the tappet 101) it is possible to make up for all the tolerance deviations of the individual components of different plastics and, thus, to guarantee a safe contact change-over at all times. This sequence of motions is acted upon by the arrangement between tappet 101 and compression spring 83.

In order to prevent tilting of the contact piece 75 which might possibly be caused by slightly eccentric actuation of contact piece 75 through tappet 101, contact piece 75 is provided with two guiding arms 103. These guiding arms 103 are located in the area of support of the contact piece 75 on the upper and lower sides of the same and extend in the transverse direction of contact piece 75 and, essentially, perpendicularly to the upper and lower sides of contact piece 75. The guiding arms 103 rest with their lateral surfaces on the inside surfaces of the journal receptacles 82 or rather of the retainers 82*a* and thus prevent the contact piece 75 from tilting around its longitudinal axis.

Figure 5:
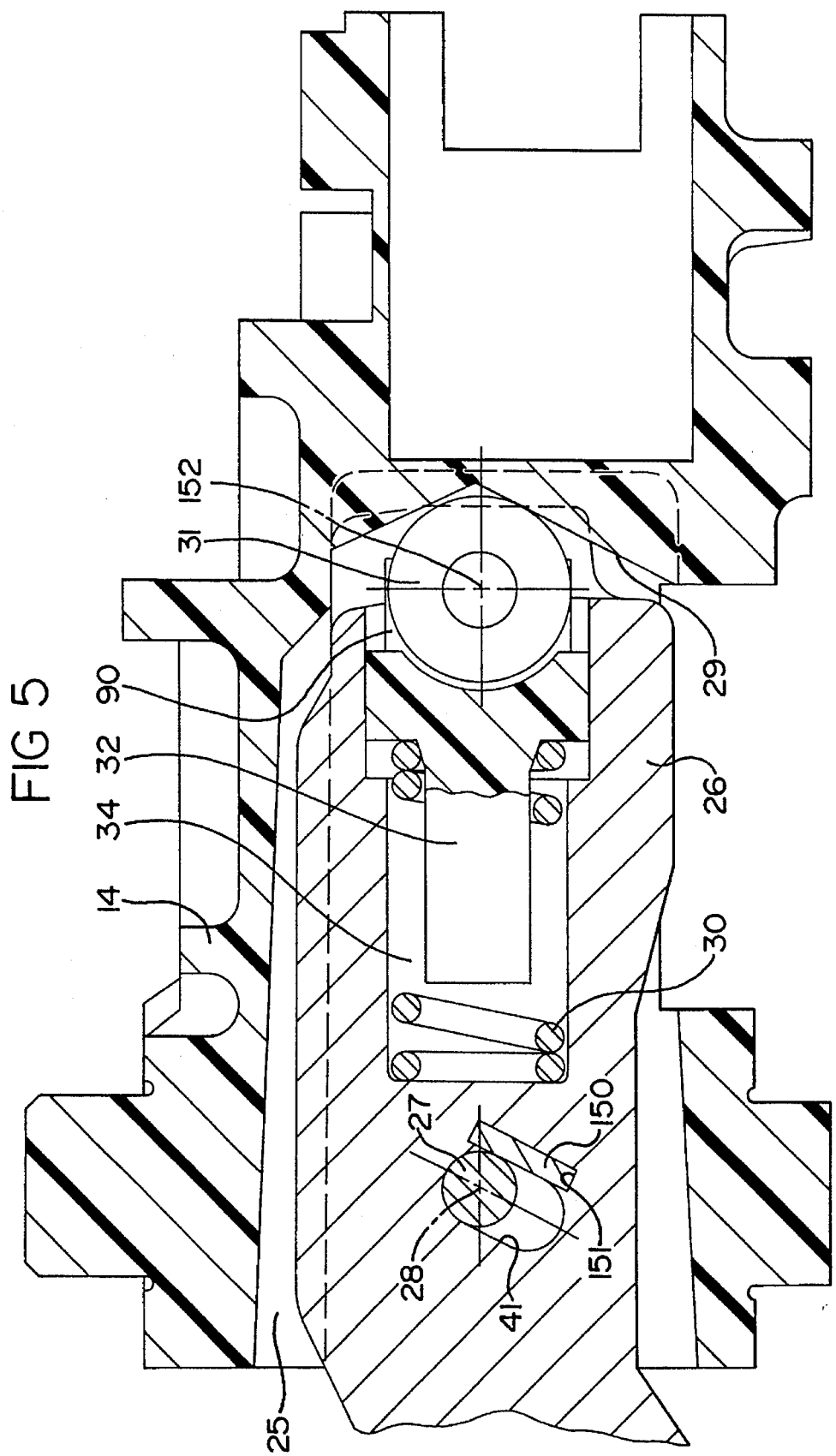
FIG. 5 is an enlarged view of the longitudinal aperture and limiting component portions of the embodiment of FIG. 1.

FIG. 5 shows a detail from FIG. 1 with an embodiment of the longitudinal aperture which is varied with regard to FIG. 1. Here, the longitudinal aperture 41 is reinforced by a limiting component 150 on its guiding edge in order to reduce the wear of bolt 27 on the longitudinal aperture 41. Bolt 27 is preferably designed as a cylindrical pin. The limiting component 150 is a steel plate inserted into a corresponding recess 151 in the lever 26. The strength of the steel plate itself exceeds that of the material of the lever 26 by far which, for instance, may be of cast zinc. Preferably, the longitudinal aperture should be shaped directly into the material of the lever 26. However, as can be seen from FIG. 1, it can also be inserted into an exchangeable bolt guide 40 which is preferably of plastic. Such a bolt guide gives the opportunity of adapting the position and type of guidance of the bolt 27 to the respective needs of various designs in a simple manner, with the mechanical design of the steering column switch remaining unchanged otherwise. Apart from that, the steering column switch as per FIG. 5 may have the same mode of operation as the steering column switch as per FIG. 1.

Figure 6:
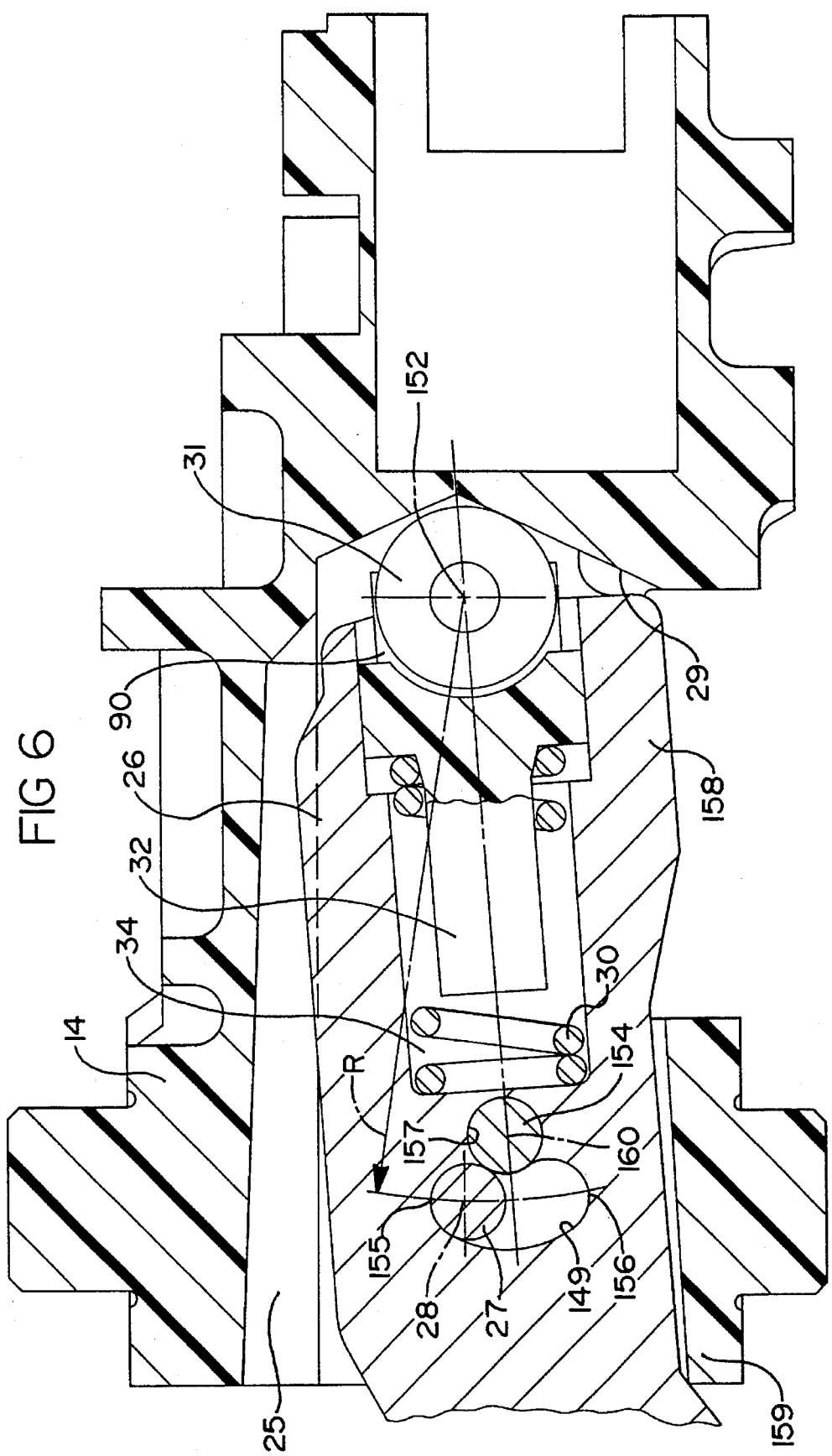
FIG. 6 is an enlarged view of the longitudinal aperture of FIG. 1 provided with another limiting component.

FIG. 6 shows another variation of the embodiment of the steering column switch of FIG. 1. Here, a curved longitudinal aperture 149 is provided which lies on a circle around the second axis 152 with the radius R. Preferably, the curvature is defined by circles described around the longitudinal axis 160 of a second cylinder 154. The width of the longitudinal aperture is slightly larger than the diameter of bolt 27.

The longitudinal aperture 149 has an approximately symmetrical arrangement with regard to the longitudinal axis of the lever 26. The curvature of the longitudinal aperture is preferably larger than the curvature of radius R. Essential for this invention is cylindrical, limiting component 154 whose diameter approximately corresponds to that of the bolt 27, with the curvature of the cylinder 154 approximately adapted to the curvature of the longitudinal aperture 149. The curvature of the cylinder 154, however, can also be smaller than that of the longitudinal aperture alongside the guiding line so that a sector of cylinder 154 projects into the longitudinal aperture. This will render a stop effect since the cylinder 154 is pressed against bolt 27 under the force of spring 30 so that the cylinder 154 will slide with a convex surface line along a corresponding convex surface line of the bolt 27 until one of the two end positions 155, 156 will have been reached which act as a stop for the bolt 27. This arrangement of two adjoining convex surfaces prevents lever 26 from assuming a permanent intermediate position.

The cylindrical limiting component 154 again is made of a strong steel and inserted into a corresponding recess 157 in the control lever 26 which encloses the surface area of the cylinder 154 for the most part and thus retains the same. On the other hand, the non-enclosed section of the lever 26 has been selected big enough to guarantee that the two cylinders 27, 154 will always be in touch with each other.

The arrangement as per FIG. 6 makes it imperative for the lever 26 to adopt one of two stable end positions wherein the bolt 27 will rest either against stop 155 or against stop 156 (see FIG. 7). Upon a further rotation of the control lever beyond either mentioned end position, it will be possible in both of the two mentioned end positions to rotate the control lever with the respective stop 155 or 156 around the bolt 27, with the control lever 26 pivoting about the first axis 28. In doing so, the front end 158 of the control lever 26 will be swung out whereby a first switch can be actuated. By means of the first switch it may, for instance, be possible to operate the flashing function or another suitable device which, in particular, may serve signalling purposes.

In the context of FIG. 6 it be assumed that the control lever 26 is in a position wherein a switch corresponding to the components 75, 101 of FIG. 1 has been actuated so that the upper beam has been turned on. This is possible in that the control lever 26 is pivoted with its left end according to FIG. 6 downwards about the second axis 152 until the bolt 27 rests against stop 155. If necessary, it is possible to turn the control lever 26 from this position around the bolt 27 by means of a further pivoting movement, thus the front end 158 of the control lever 26 moving upwards and triggering another suitable switch. This is not possible in the present example of an embodiment as per FIG. 6 since a support 159 limits any further downwards-directed pivoting movement of the lever 26.

In FIG. 7, the control lever 26 as per FIG. 6 is represented in its second end position where the stop 156 rests against bolt 27. This end position reached by an upwards-directed pivoting movement of the left end of lever 26 according to FIG. 7 now permits the lever 26 to pivot with the stop 156 about the bolt 27, thus the front end 158 of FIG. 7 being pivoted downwards and thus, as already explained above, triggering a suitable switch such as the flashing switch.

Proceeding from the lower-beam position shown in FIG. 7, it is possible in this way to operate the flashing function at any time by a further motion of the lever 26 beyond the lower-beam position.

I claim:

1. A steering column switch for automotive vehicles, comprising:

a switch housing having a manually pivotable switch lever connected to a first moving electric contact and a second moving electric contact, wherein said switch lever is pivotable in a first position about a first axis effective for actuating said second electric contact, and is further guided in a longitudinal aperture to a second position to be pivotable about a second axis essentially parallel to the first axis and effective for actuating said first electric contact, and wherein said switch lever is supported in a carrier rotatable around a third axis which is essentially perpendicular to the second axis, wherein said longitudinal aperture is partially defined by a guiding surface, wherein said guiding surface is defined by a limiting component inserted into the switch lever, said carrier further including a first cylindrical pin anchored in the carrier and slides along the limiting component while the lever is guided in said longitudinal aperture towards said second position.

2. A steering column switch as claimed in claim 1, wherein the lever is resiliently prestressed along the direction of a connecting line between the first axis and the longitudinal aperture, wherein under the prestress of a spring, the limiting component slides along the first cylindrical pin during the guidance of the lever in the longitudinal aperture.

3. A steering column switch as claimed in claim 1, wherein the limiting component is formed out of a material of higher strength than that of the lever.

4. A steering column switch as claimed in claim 3, wherein the limiting component is an essentially cuboid-shaped limiting plate retained within the lever.

5. A steering column switch as claimed in claim 3, wherein the limiting component is a second cylindrical pin which extends generally parallel to an axis of the first cylindrical pin.

6. A steering column switch as claimed in claim 5 wherein the first cylindrical pin and the second cylindrical pin are formed by circular cylinders having generally the same diameter.

7. A steering column switch as claimed in claim 6, wherein the curvature of the guiding surface of the limiting component is larger than the curvature of the following guiding sections of the longitudinal aperture.

8. A steering column switch as claimed in claim 7, wherein the limiting component is arranged symmetrically in respect of the longitudinal aperture.

9. A steering column switch as claimed in claim 7, wherein the longitudinal aperture is inclined so as to point generally towards the second electric contact.

10. A steering column switch as claimed in claim 7, wherein the longitudinal aperture extends alongside a circular line having a center coincident with the first axis.

11. A steering column switch as claimed in claim 10, wherein the lever, under resilient prestress, adopts one of two stable end positions.

12. A steering column switch as claimed in claim 11, wherein upon a movement of the lever beyond at least one of said end positions, the lever pivots about the appertaining stop, thus activating at least one of said first and second electric contacts.

13. A steering column switch for automotive vehicles, comprising a switch housing accommodating a lever having a longitudinal aperture, said lever activating a first contact piece controlling a first moving electric contact and a second contact piece controlling a second moving electric contact, said lever being supported in a carrier arranged in said housing, so as to be manually pivotable about a pivot axis located within said longitudinal aperture, wherein said longitudinal aperture extends in the direction of the second contact piece.

14. A steering column switch as claimed in claim 13, wherein said pivot axis is formed by a bolt which, in the rest position of the lever, is situated at an end of the longitudinal aperture which is remote from the second contact piece.

15. A steering column switch as claimed in claim 14, wherein said lever has at least two switching steps, with the second contact piece being operated in a first switching step and with the first contact piece being operated in a second switching step.

16. A steering column switch as claimed in claim 15, wherein said lever extends into the switch housing through a wall of the same and wherein at least one of said first contact piece, said second contact piece, and said second moving electric contact are aligned transversely to the lever.

17. A steering column switch as claimed in claim 16, further including a slide adjoining said lever and wherein said switch housing includes an opening defined, in part, by a bearing bridge and a base plate, and wherein said slide penetrates into said opening and abuts at least one said second contact piece and said second moving contact.

18. A steering column switch as claimed in claim 17, wherein the carrier includes walls defining a cavity essentially flaring outwards and accommodating the lever.

19. A steering column switch as claimed in claim 18, wherein there is a feelable pressure point between pivoting movements of the lever for actuating each one of the contact pieces.

20. A steering column switch as claimed in claim 19, wherein the second contact piece is supported in a second longitudinal aperture.

21. A steering column switch as claimed in claim 20, further including a tappet extending between said lever and said contact piece, wherein the second longitudinal aperture extends essentially perpendicular to a direction of a longitudinal axis of the tappet acted upon by the lever.

22. A steering column switch as claimed in claim 20, wherein the second longitudinal aperture is provided in the second contact piece.

* * * * *

UNITED STATES PATENT AND TRADEMARK OFFICE
CERTIFICATE OF CORRECTION

PATENT NO. : 5,600,110
DATED : February 4, 1997
INVENTOR(S) : Walter Neubauer

It is certified that error appears in the above-indentified patent and that said Letters Patent is hereby corrected as shown below:

Column 11, line 10, should read after the word "one", -- of added--.

Signed and Sealed this

First Day of July, 1997

Attest:

BRUCE LEHMAN

Attesting Officer　　　Commissioner of Patents and Trademarks